(12) United States Patent
Flegel

(10) Patent No.: US 6,369,321 B1
(45) Date of Patent: *Apr. 9, 2002

(54) GENERATOR POWER INLET BOX WITH SELECTIVELY ENGAGEABLE GENERATOR CORD

(75) Inventor: David D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/777,181

(22) Filed: Feb. 5, 2001

Related U.S. Application Data

(63) Continuation-in-part of application No. 08/990,172, filed on Dec. 12, 1997, now Pat. No. 6,148,461.

(51) Int. Cl.⁷ .................................................. H01J 5/00
(52) U.S. Cl. ............................ 174/50; 174/58; 174/60; 174/135; 220/3.8; 220/4.02; 248/906
(58) Field of Search .............................. 174/50, 53, 48, 174/58, 60, 135, 67; 220/242, 4.02, 3.2, 3.8, 3.6; 439/535; 248/906; 29/686

(56) References Cited

U.S. PATENT DOCUMENTS

| | | | |
|---|---|---|---|
| 2,856,470 A | 10/1958 | Hyde | |
| 3,277,251 A | 10/1966 | Daly | |
| 3,284,591 A | 11/1966 | Daly | |
| 3,315,556 A | 4/1967 | Speck | |
| 3,361,938 A | 1/1968 | Watson | |
| 3,391,374 A | 7/1968 | Schleicher | |
| 3,523,166 A | 8/1970 | Daly | |
| 3,559,148 A | 1/1971 | Hafer | |
| 3,636,237 A | 1/1972 | Hafer | |
| 3,654,484 A | 4/1972 | Jorgenson et al. | |
| 3,716,683 A | 2/1973 | Hafer | |
| 3,723,942 A | 3/1973 | Dennison | |
| 3,731,256 A | 5/1973 | Hafer | |
| 3,739,321 A | 6/1973 | Murphy et al. | |
| 3,742,431 A | 6/1973 | Kobyner | |
| 3,746,936 A | * 7/1973 | Coffey et al. | ......... 174/52 R X |
| 3,781,765 A | 12/1973 | Schleicher | |
| 3,922,053 A | 11/1975 | Hafer | |
| 4,067,529 A | 1/1978 | Milcoy | |
| 4,088,829 A | 5/1978 | Milcoy | |
| 4,282,954 A | 8/1981 | Hill | |
| 4,605,817 A | 8/1986 | Lopez | |
| 5,070,252 A | 12/1991 | Castenschiold et al. | |
| 5,174,773 A | 12/1992 | Jones | |
| 5,268,850 A | 12/1993 | Skoglund | |
| 5,402,323 A | 3/1995 | Schwenk et al. | |
| 5,579,201 A | 11/1996 | Karageozian | |
| 5,717,164 A | 2/1998 | Shetterly | |
| 5,773,757 A | 6/1998 | Kenney et al. | |
| 5,984,719 A | * 11/1999 | Flegel | ..................... 439/535 X |
| 6,184,461 B1 | 2/2001 | Flegel | |

OTHER PUBLICATIONS

GENTRAN Catalog, CT1094C, Reliance Time Controls, Inc. 1820 Layard Avenue, Racine, WI 53404, undated.

* cited by examiner

Primary Examiner—Anthony Dinkins
Assistant Examiner—Dhiru R Patel
(74) Attorney, Agent, or Firm—Andrus, Sceales, Starke & Sawall, LLP

(57) ABSTRACT

A remote power inlet arrangement for use with a portable generator having a power outlet, for providing auxiliary power to the main electrical panel or load center of a building. The power inlet arrangement includes a power inlet which is secured inside a power inlet enclosure. An electrical cord is selectively engageable at one end to the power inlet. The electrical cord has a plug at a second end which can be engaged with the power outlet of the portable generator. The electrical cord is stored inside the power inlet enclosure when not in use. A door having a peripheral resilient seal is attached to the power inlet enclosure to provide a weathertight seal when the door is in a closed position. A securing mechanism is provided to maintain the door in its closed position.

22 Claims, 6 Drawing Sheets

GENERATOR POWER INLET BOX WITH SELECTIVELY ENGAGEABLE GENERATOR CORD

CROSS-REFERENCE TO RELATED APPLICATIONS

This application is a continuation-in-part of U.S. patent application Ser. No. 08/990,172, filed Dec. 12, 1997, now U.S. Pat. No. 6,148,461 issued Feb. 6, 2001.

FIELD OF THE INVENTION

In general, the invention relates to a power inlet arrangement. In particular, the invention relates to a power inlet arrangement for providing power from a generator to a load center.

BACKGROUND OF THE INVENTION

Portable generators may be used in certain situations to feed electrical power to the electrical load center of a commercial or residential building during a utility power outage. In a typical application, the generator supplies power to a power inlet box which interconnects the generator with a transfer switching mechanism. The transfer switching mechanism continues the electrical path through to selected electrical loads through circuit breakers located at the transfer switching mechanism.

In the past, the use of a portable generator involved finding or assembling an electrical cord which can be plugged in at one end to the portable generator and at the other end to the power inlet box. This involves additional time and expense on the part of the installer or user. Further, the fact that the cord is separate from the generator makes it possible for the cord to become misplaced or lost, and thus unavailable when needed.

The situation arises where, because of the inconvenience associated with the above-mentioned procedure, it is desirable to maintain an electrical cord and its associated power inlet box together. When the portable generator is used, the need for any additional cords or adapter fittings would not arise.

BRIEF SUMMARY OF THE INVENTION

It is an object of the present invention to provide a power inlet arrangement having a selectively engageable cord with a plug for connection to a portable power generator. It is a further object of the invention to provide a power inlet arrangement including an enclosure within which the cord is stored when not in use. Yet another object of the invention is to provide a power inlet arrangement which is relatively simple in its components and which provides significant convenience to the user by ensuring the power inlet cord is always available when needed.

In one aspect of the invention, a remote power inlet electrically connected to a power distribution panel for supplying power to the power distribution panel from a power generator having an outlet, includes an enclosure associated with the power inlet and defining an internal cavity. The enclosure includes a door for selectively providing access to the internal cavity, and the internal cavity is adapted to receive a power cord for interconnecting the power inlet with the generator power outlet. The cord is adapted to be received within the internal cavity and enclosed by the door when not in use. The power cord defines a first end which is selectively engageable with the power inlet, and a second end having a first plug or connector selectively engageable with the generator power outlet. The power cord terminates at its first end in a second plug or connector engageable with an electrical receptacle associated with the power inlet such that the power cord is selectively engageable with the power inlet for establishing an electrical connection of the power cord with the power inlet. The enclosure defines an inner wall, and the power inlet may be secured adjacent to the inner wall of the enclosure. Alternatively, the power inlet may be located exteriorly of the internal cavity of the enclosure. The door is movable between an open position and a closed position, and the enclosure includes a notch such that the power cord passes through the notch and is engageable with the power generator outlet when the door is in its closed position. The enclosure includes a securing mechanism for selectively securing the door in its closed position to prevent access to the interior of the enclosure. The enclosure includes a plurality of walls and the power inlet may be at least partially defined by one or more of the enclosure walls.

In another aspect of the invention, in a power inlet arrangement for use with a portable generator having a power outlet, a method of providing an electrical cord usable with the portable generator includes the steps of selectively engaging or removably securing the first end of an electrical cord to a power inlet, wherein the electrical cord defines a second end having an electrical plug; and providing a cord enclosure adjacent the power inlet. The electrical cord is selectively placed within the cord enclosure when not in use, such that the cord is contained within the cord enclosure. The electrical cord is adapted to be used by engaging the first end of the cord with the power inlet, and withdrawing the cord from the enclosure for providing engagement of the electrical plug with the generator power outlet. The method further includes the step of hingedly attaching a door having an open position and a closed position to the power inlet enclosure, for selectively enclosing the power inlet and the electrical cord when the door is in its closed position. The step of removably securing the electrical cord to the power inlet includes providing an electrical cord connector at the end of the electrical cord, providing a power inlet engagement arrangement in the power inlet, and engaging the electrical cord connector with the power inlet engagement arrangement.

In yet another aspect of the invention, a power inlet arrangement for use with a portable generator having a power supply outlet includes an enclosure including walls defining an internal cavity. The enclosure includes a door which is selectively movable between an open position providing access to the internal cavity and a closed position for maintaining an electrical cord within an interior of the enclosure when the electrical cord is in a storage position. A power inlet housing is located adjacent the internal cavity. In one embodiment, the power inlet housing is located within the internal cavity of the enclosure. The power inlet housing includes one or more walls located within the internal cavity and defining an interior within which an electrical receptacle is located. The electrical receptacle is adapted for interconnection with a power transfer panel for controlling the supply of power from the generator to an electrical system of a building. The electrical cord has a first end which is selectively engageable with the power inlet housing, and a second end having an electrical plug. The electrical cord is adapted to be stored within the internal cavity of the enclosure when not in use and maintained therein by movement of the door to the closed position. The electrical cord is adapted to be withdrawn from the internal cavity for use by movement of the door to the open position and withdrawal of the cord outwardly of the internal cavity. The first end of the cord is engaged with the power inlet housing either before or after the cord is withdrawn from the internal cavity. The plug at the second end of the cord is engageable with the power supply outlet of the generator to supply power to the cord and the electrical receptacle, and through the electrical receptacle to the power transfer panel and building electrical system. The first end of the cord includes a twist-locking connector for removably securing the first end of the cord to the electrical receptacle. The electrical receptacle includes a series of prongs and the twist-locking connector has a rotatable portion engageable with the prongs of the electrical receptacle. The enclosure includes a series of walls which define an opening and the door is pivotably mounted to one of the walls of the enclosure for selectively providing access to the internal cavity through the opening and preventing access to the internal cavity through the opening. When the internal cavity is open, the cord is adapted to be coiled for placement into the internal cavity. The door is then closed to maintain the cord within the internal cavity when not in use. In another embodiment, the power inlet housing is located exteriorly of the internal cavity of the enclosure.

In yet another aspect of the invention, a method of connecting a portable generator to an electrical system of a building includes the steps of mounting an enclosure to a wall of the building. The enclosure includes walls defining an internal cavity and a door which is selectively movable between an open position providing access to the internal cavity and a closed position preventing access to the internal cavity. An electrical cord is placed within the internal cavity. The electrical cord has a first end and a second end. The second end of the electrical cord includes an electrical plug adapted to engage a power supply outlet of the generator. The first end of the electrical cord is selectively engageable with a power inlet arrangement interconnected with the enclosure. The power inlet arrangement includes a power inlet housing located within the internal cavity of the enclosure or exteriorly of the internal cavity of the enclosure, and establishes an electrical connection of the electrical cord with a power transfer panel interconnected with the electrical system of the building. The electrical cord is adapted to be stored within the internal cavity when not in use. The method also includes the step of selectively moving the door to the open position to provide access to the internal cavity and to the electrical cord, withdrawing the electrical cord from the internal cavity, and engaging the plug at the second end of the electrical cord with the power supply outlet of the portable generator.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
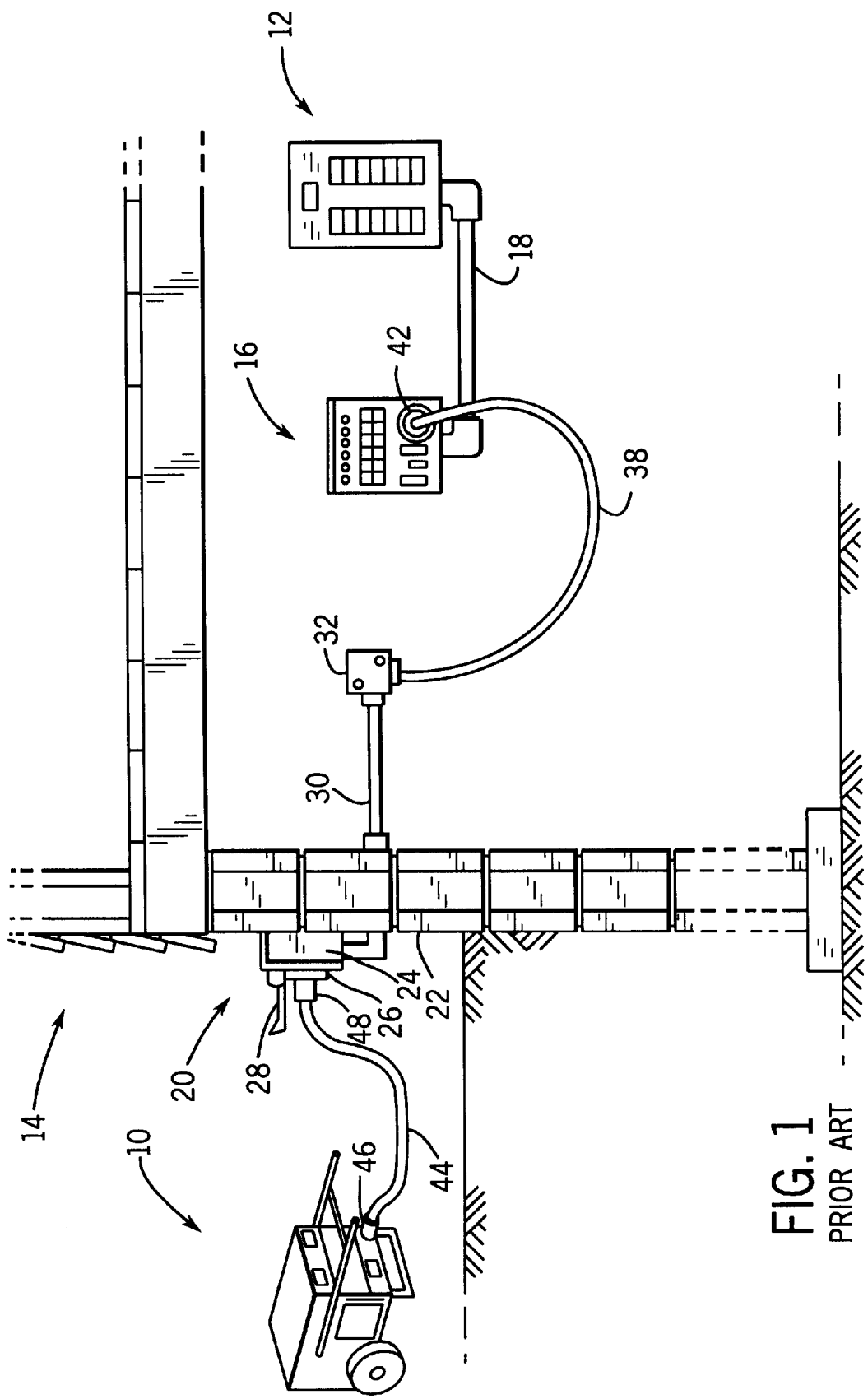
FIG. 1 is a schematic representation showing a prior art power inlet arrangement for interconnecting a portable power generator with an electrical panel associated with a building.

FIG. 1 shows a prior art power inlet arrangement for interconnecting a portable generator 10 with a main electrical panel or load center 12 located in the interior of a building 14. In the prior art power inlet arrangement of FIG. 1, a manual power transfer panel 16 is mounted adjacent main panel 12, and is interconnected therewith via a series of wires enclosed by a conduit 18 extending between main panel 12 and transfer panel 16. Transfer panel 16 may illustratively be a panel such as that manufactured by Reliance Controls Corporation of Racine, Wis., under the designation GENSWITCH (e.g. Model 20216 or any other satisfactory model).

A power inlet box 20 is mounted to the wall of a building 14, shown at 22. Power inlet box 20 includes an external housing including a series of walls, such as 24, and a recessed flanged inlet 26 mounted to a front of the housing. A cover 28 is mounted to the front wall of the housing via a hinge structure, and is movable between an open position, as shown in FIG. 1, and a closed position in which cover 28 encloses recessed flanged inlet 26 when not in use. A conduit 30 extends between inlet box 20 and a junction box 32, and a flexible cord 38 is attached at one end to junction box 32. At its opposite end, flexible cord 38 has a connector 42 engageable with a recessed flanged inlet provided on transfer panel 16. Appropriate wiring and connections are contained within inlet box 20, conduit 30 and junction box 32 for providing an electrical path between inlet box 20 and transfer panel 16 when cord 38 is engaged with the recessed flanged inlet of transfer panel 16.

A power cord 44 extends between generator 10 and power inlet box 20. Cord 44 includes a plug 46 at one end, which is engageable with the power outlet of generator 10. Cord 44 further includes a connector 48 at the end opposite plug 46. Connector 48 is engageable with recessed flanged inlet 26, for transferring power generated by generator 10 to power inlet box 20, which is then supplied through the wiring in conduit 30, junction box 32, cord 38 and plug 42 to transfer panel 16, and from transfer panel 16 through the wiring in conduit 18 to main panel 12. In this manner, generator 10 functions to provide power to selected circuits of main panel 12 during a power outage.

Cord 44, which connects generator 10 to power inlet box 20, is often a custom-made cord in which plug 46 and connector 48 are specially selected according to the configuration of the generator power outlet and recessed flanged inlet 26, respectively. Alternatively, it is possible to construct a cord such as 44, utilizing conventional power cords together with specialized adapter fittings. Either way, it can be difficult to provide such a cord having correct fittings for both the outlet of the generator 10 and recessed flanged inlet 26 of power inlet box 20. Furthermore, cord 44 is separate from both generator 10 and power inlet box 20, which gives rise to problems of properly storing cord 44 when not in use, so as to ensure cord 44 is not lost or misplaced.

Figure 2:
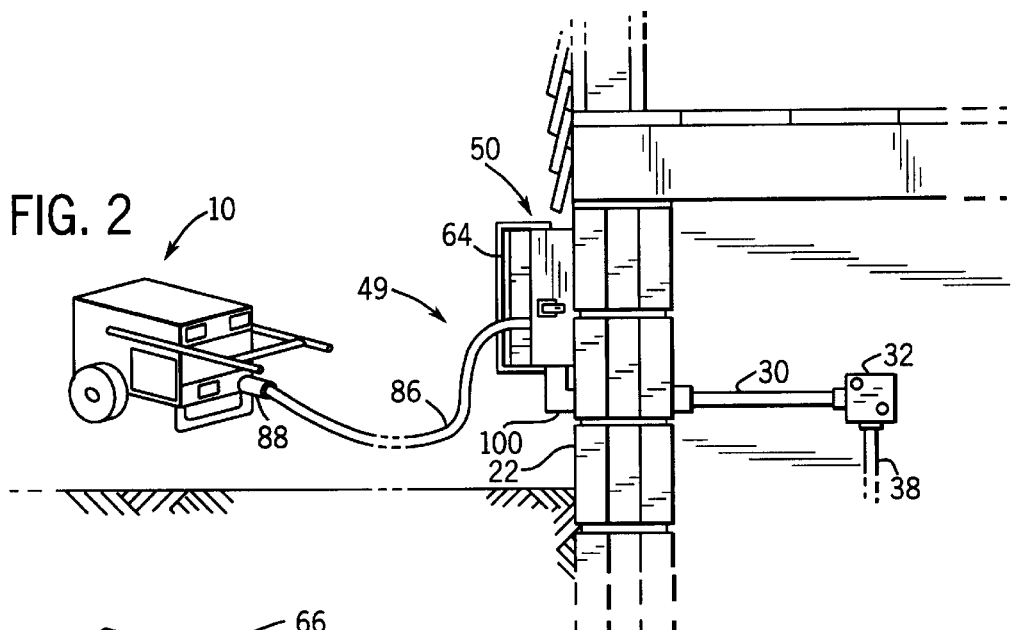
FIG. 2 is a schematic representation similar to FIG. 1, showing the power inlet arrangement in accordance with the present invention.

FIG. 2 illustrates a power inlet arrangement 49 of the invention for providing power from generator 10 to main electrical panel 12. As shown in FIG. 2, the prior art power inlet box of FIG. 1 is replaced with a power inlet enclosure shown generally at 50, mounted to building wall 22. Conduit 30, junction box 32 and cord 38 are of the same construction and configuration as illustrated in FIG. 1, for transferring power from power inlet enclosure 50 to transfer panel 16 in the same manner as is known in the prior art.

Figure 3:
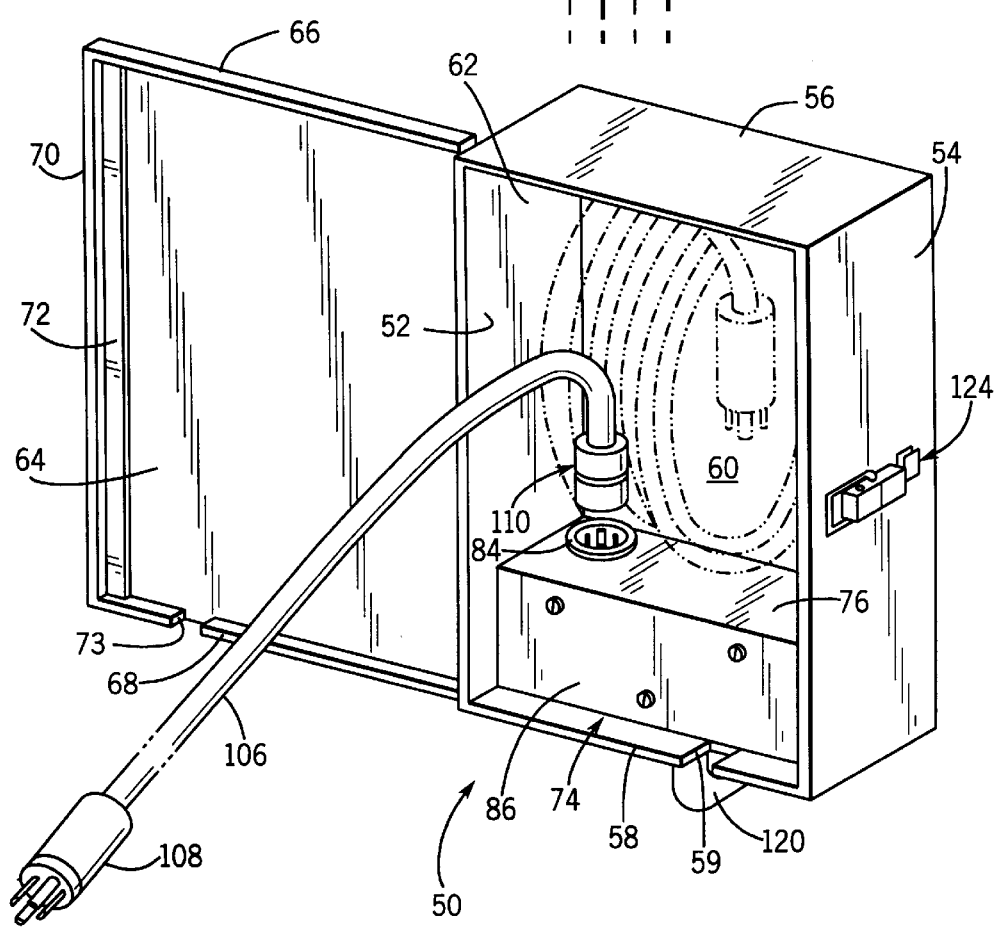
FIG. 3 is an isometric view of the power inlet arrangement of FIG. 2.

Referring to FIGS. 2 and 3, power inlet enclosure 50 includes a box having a pair of sidewalls 52,54 and top and bottom end walls 56,58, respectively. A notch 59 is formed in bottom end wall 58. Enclosure 50 further includes a back wall 60 which cooperates with sidewalls 52,54 and end walls 56,58 to define an internal cavity 62. Enclosure 50 further includes a door 64 hingedly mounted to sidewall 52, for movement between an open position, as shown in FIG. 3 providing access to cavity 62, and a closed position in which door 64 engages the outer edges of walls 52–58 for closing cavity 62 and preventing access thereto. Door 64 includes upper and lower lips 66,68, respectively, as well as side lips 70. A peripheral resilient seal 72 is located at the outer edges of door 64 adjacent lips 66–70, and is engageable with the outer edges of walls 52–58 when door 64 is closed so as to provide a weathertight seal for cavity 62. A notch 73 is formed in lower lip 68.

Figure 4:
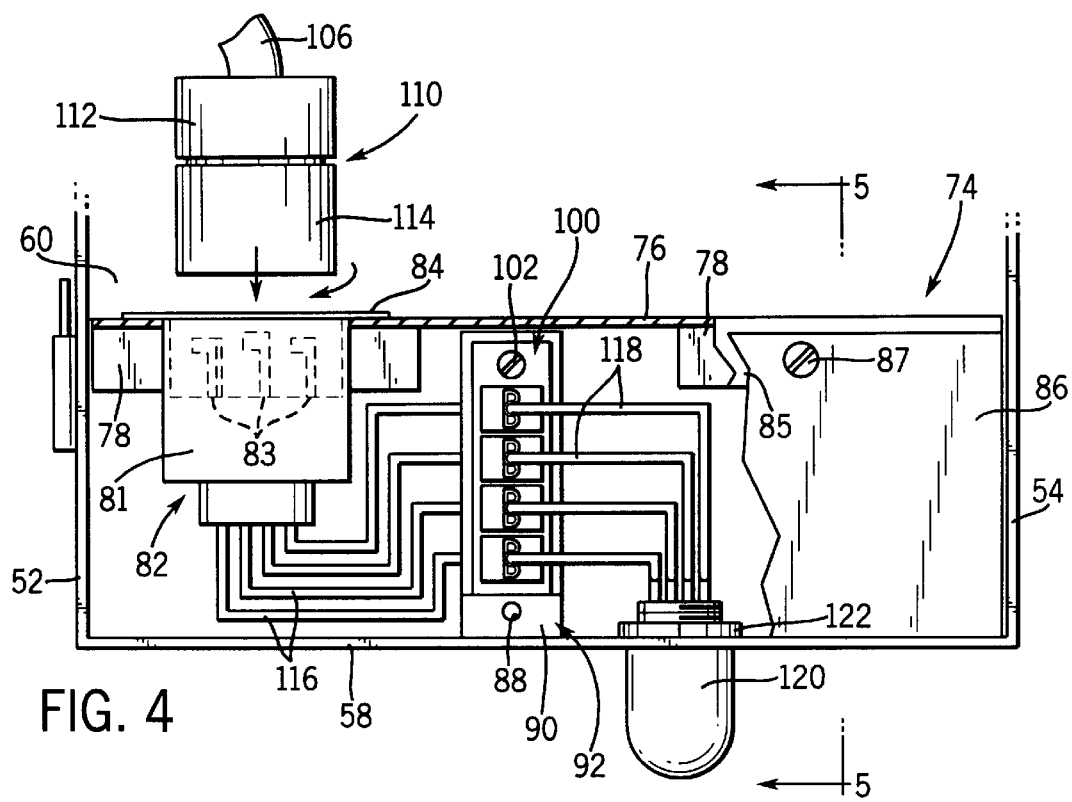
FIG. 4 is a partial front elevational view, with portions broken away, showing the lower portion of the power inlet arrangement of FIG. 2.
Figure 5:
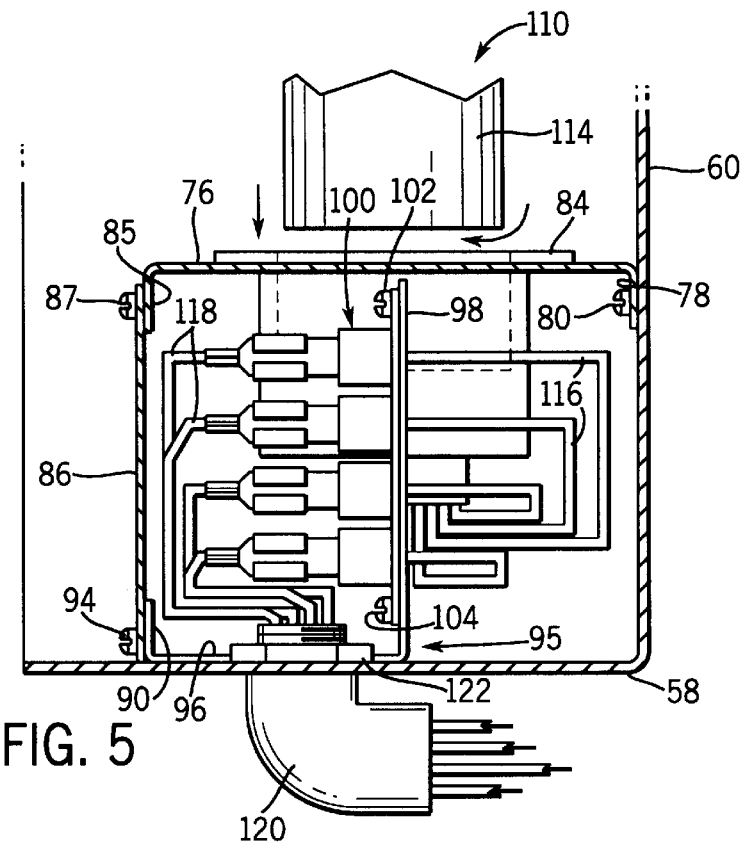
FIG. 5 is a partial section view taken along line 5—5 of FIG. 4.

Referring to FIGS. 3–5, a power inlet 74 is located within the lower portion of cavity 62. Power inlet 74 includes a top wall 76 mounted to back wall 60 via a pair of rear flanges 78 and a set of fasteners 80. Top wall 76 is formed with a circular hole which receives a cylindrical body 81 of an electrical receptacle 82 having a series of flag-shaped prongs 83. The body 81 includes a circular lip 84 having a diameter larger than the receptacle 82, so that the lip 84 overlies the top wall 76 and suspends the receptacle 82 therefrom. While not shown in the drawings, threaded fasteners such as screws extend through openings in lip 84 into engagement with threaded openings in top wall 76, to secure body 81 to top wall 76. Top wall 76 also has a pair of front flanges 85 which are formed with suitable threaded openings. Each of the openings provided in flange 85 is aligned with a suitable aperture formed in an upper edge of a front cover plate 86. Fasteners 87 extend through the apertures in the cover plate 86 and into threaded engagement with openings in flanges 85 for securing the upper edge of cover plate 86 to the top wall 76 in internal cavity 62. The lower edge of cover plate 86 is formed with a suitable aperture that is aligned with a screw threaded opening 88 provided in a front flange 90. A fastener 94 extends through the aperture in the lower edge of cover plate 86 and into threaded engagement with the front flange opening 88 to secure the cover plate 86 in place within internal cavity 62. Front flange 90 forms a part of a bracket 95 which includes a horizontal, bottom portion 96 which is supported by lower wall 58, and a vertical rear portion 98 which serves as a mounting surface for terminal block 100. Vertical rear portion 98 is formed with upper and lower screw threaded openings aligned with upper and lower holes formed in the terminal block 100. An upper fastener 102 and a lower fastener 104 pass through the aligned openings and holes, and secure the terminal block 100 to bracket 95 within the internal cavity 62.

Power inlet arrangement 49 further includes a flexible cord 106 having a first plug 108 at its outer end. Plug 108 is configured so as to be engageable with the power outlet of generator 10. The end of the cord 106 opposite plug 108 is adapted to be selectively engaged with power inlet housing 74 in any satisfactory manner. As shown in FIGS. 3–5, the end of cord 106 is removably secured to the power inlet assembly 74 via a second connector 110 having an upper portion 112 and a lower portion 114, which together are pushed downwardly to receive the prongs 83 of receptacle 82 and then rotated so as to form a twist lock.

As shown in FIG. 4, and in accordance with known construction, cord 106 is adapted to be selectively engaged with receptacle 82, which includes a series of wires 116 electrically connected at their ends to terminal block 100. A series of wires 118 are also connected to terminal block 100 and extend through an elbow 120 mounted to lower wall 58 via a lock nut 122 for supply to conduit 30 within the interior of building 14. In this manner, wires 116, terminal block 100 and wires 118 provide an electrical path for supplying power from generator 10 to main panel 12 when plug 108 is engaged with the power outlet of generator 10. As described above, cover plate 86 can be removed relatively easily so as to provide access to terminal block 100 for connecting wires 118 thereto.

A latch assembly 124 is mounted to sidewall 54, and a catch is mounted to vertical lip 70 of door 64. In a manner as is known, latch assembly 124 is operable to selectively maintain door 64 in its closed position preventing access to internal cavity 62, or to enable door 64 to be moved to its open position, as shown in FIG. 3. Latch assembly 124 and its associated catch preferably include a locking arrangement in a manner as is known, for receiving a lock to prevent operation of latch assembly 124 and to maintain door 64 in its closed position.

In operation, power inlet arrangement 49 is operable to connect generator 10 with main electrical panel 12 as follows. The user first operates the latch assembly 124 so as to release door 64, and door 64 is moved to its open position of FIG. 3, to provide access to internal cavity 62, within which cord 106 and plug 108 are stored when not in use. The user then withdraws cord 106 from internal cavity 62 and then engages twist-type connector 110 with receptacle prongs 83. Cord 106 and plug 108 are then manipulated to place cord 106 within notch 59 formed in bottom wall 58. Door 64 can then be returned to its closed position, and notch 73 receives cord 86 for enabling door 64 to be fully closed. Latch assembly 124 is then operated to secure door 64 closed. Plug 108 is then engaged with the power outlet of generator 10 in a conventional manner, and generator 10 is operated to supply power to main panel 12 through transfer panel 16. When power is restored or when it is no longer desired to operate generator 10 for any other reason, plug 108 is disengaged from the power outlet of generator 10 and door 64 is returned to its open position. The user then disengages connector 110 from receptacle prongs 83, and places cord 106, plug 108 and connector 110 into internal cavity 62 above power inlet housing 74, such that cord 106, plug 108 and connector 110 are fully contained therewithin. Door 64 is then returned to its closed position and maintained closed by latch assembly 124, so that cord 106, plug 108 and connector 110 are fully enclosed within internal cavity 62 and stored in preparation for a subsequent use.

Figure 6:
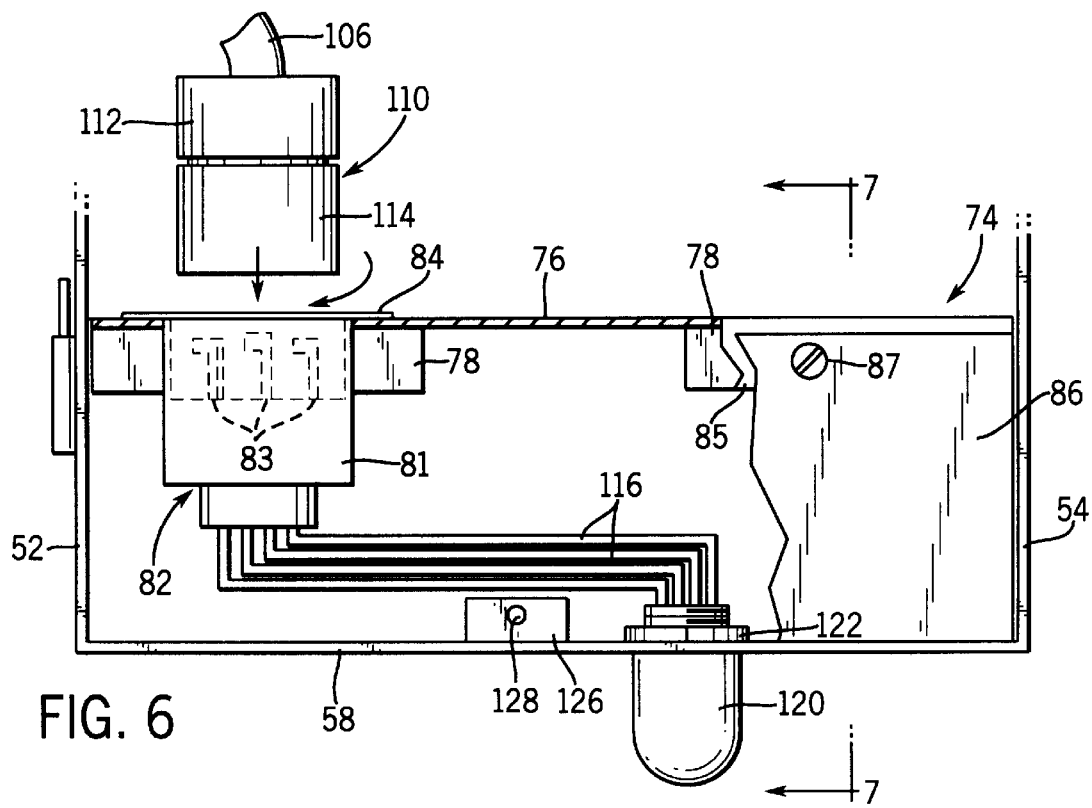
FIG. 6 is a view similar to FIG. 4, showing the lower portion of a first alternative power inlet arrangement.
Figure 7:
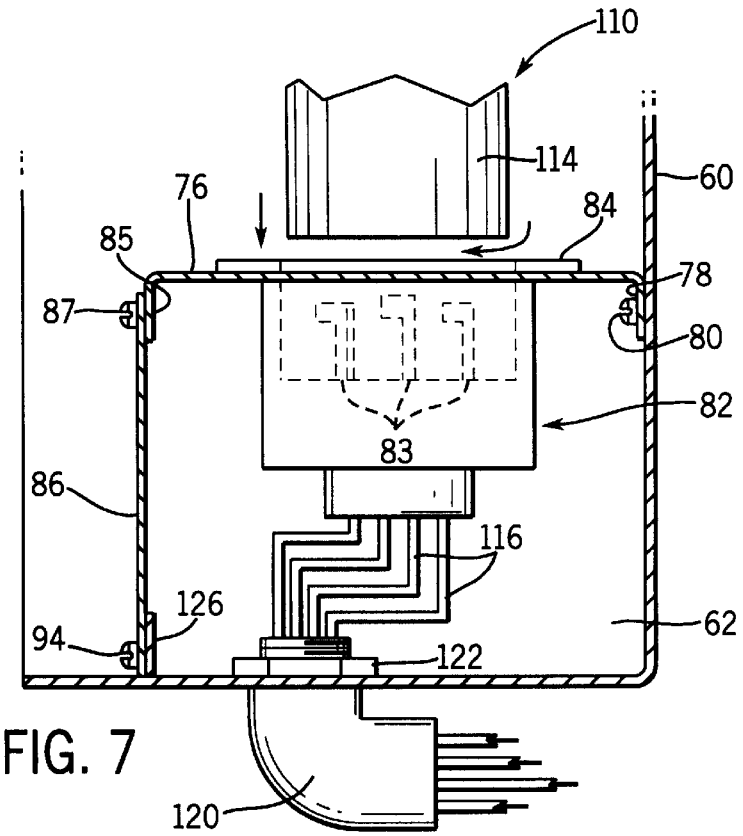
FIG. 7 is a partial section view taken along line 7—7 of FIG. 6.

FIGS. 6 and 7 show a first alternative embodiment of the present invention which is identical to the embodiment of FIGS. 3–5, except that the wires 116 connected to the receptacle 82 are routed directly through the elbow 120 to the main panel 12 without the need for terminal block 100. Because terminal block bracket 92 is not needed, the lower edge of cover plate 86 is engageable with a single upstanding tab 126 projecting from lower wall 58 and having a threaded opening 128. Opening 128 is placed in alignment with the aperture in the lower edge of cover plate 86 and fastener 94 extends through the aperture and into threaded engagement with opening 128 for securing cover plate 86 in position.

Figure 8:
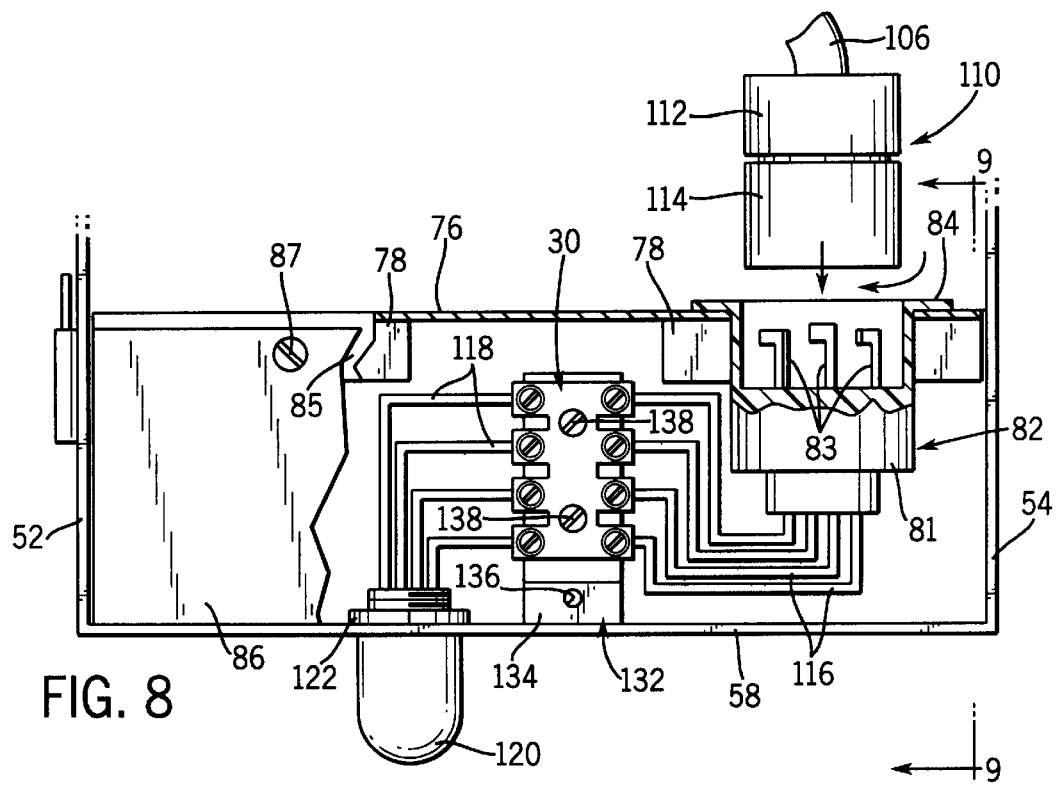
FIG. 8 is a view similar to FIG. 4, showing the lower portion of a second alternative power inlet arrangement.
Figure 9:
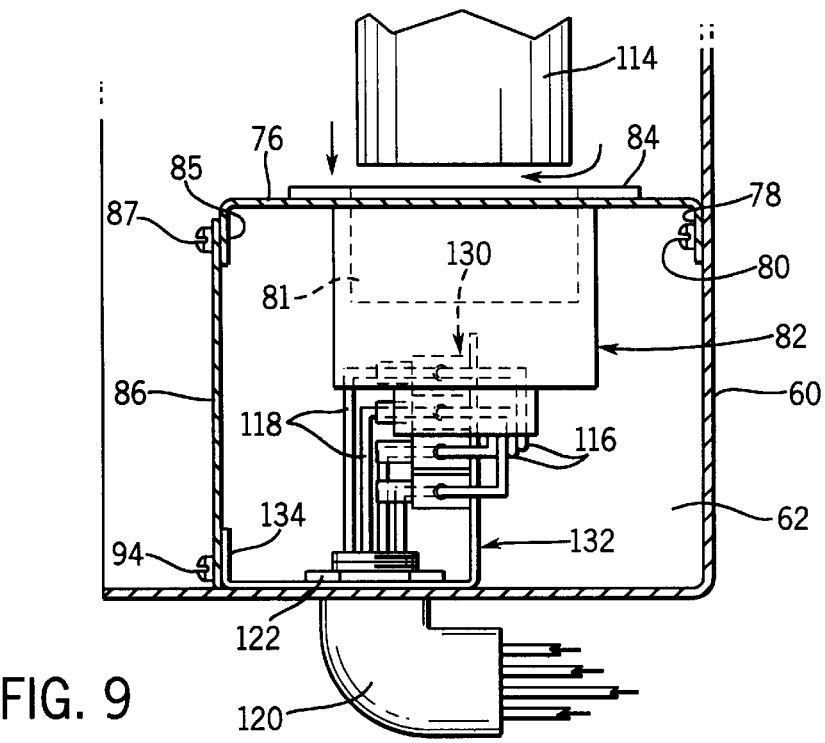
FIG. 9 is a partial section view taken along line 9—9 of FIG. 8.

FIGS. 8 and 9 illustrate a second alternative embodiment of the present invention which is identical to the embodiment of FIGS. 3–5, except that receptacle 82 and connector 110 are moved to the far right-hand end of the power inlet housing 74, and a junction block 130 and junction block bracket 132 are used in place of terminal block 100 and terminal bracket 92. Junction block bracket 132 includes a front flange 134 having an aperture 136 like flange 90 which is used to secure the lower edge of cover plate 86 with fastener 94. The bracket 132 provides a mounting surface for the junction block 130 which is coupled to the bracket 132 by a pair of fasteners 138.

Figure 10:
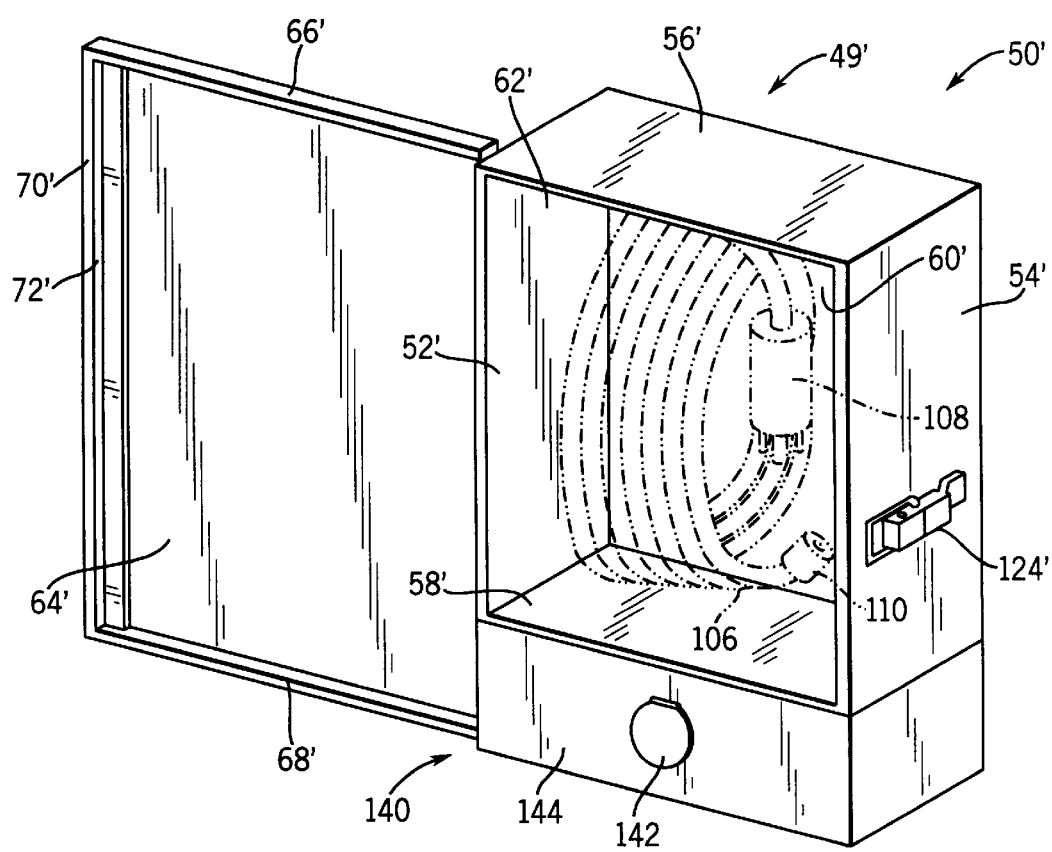
FIG. 10 is a view similar to FIG. 3, illustrating an alternative power inlet arrangement constructed in accordance with the invention.

FIG. 10 illustrates an alternative power inlet arrangement 49' constructed according to the invention. The general construction and components of power inlet arrangement 49' are similar to those described with respect to power inlet 49, and primed reference characters will be used where possible to facilitate clarity.

Power inlet arrangement 49' includes an enclosure 50' which includes sidewalls 52', 54', top and bottom walls 56', 58', respectively, and back wall 60'. Walls 52'–60' cooperate to define an internal cavity 62'. A door 64' is secured via a hinge to sidewall 52', and is movable between an open position as shown in FIG. 10, and a closed position in which door 64' engages the outer edges of walls 52'–58' to prevent access to internal cavity 62'. Door 64' includes top and bottom lips 66', 68', respectively, and a side lip 70'. A notch 73' is formed in bottom lip 68', and resilient weather proofing strips 72' are secured to the inside surface of door 64'. A latch mechanism 124' is engaged with sidewall 54', and is selectively engageable with a catch on door 64' for maintaining door 64' in its closed position.

A power inlet housing 140 is mounted below enclosure 50'. Power inlet housing 140 has a similar construction and function as power inlet housing 74, but is located exteriorly of internal cavity 62' rather than inside of enclosure 50 as power inlet 74. A spring-biased weather-tight cover 142 is mounted to the wall of power inlet housing 140 to which electrical receptacle 82 is mounted. As shown, cover 142 is secured to the front wall of power inlet housing 140, shown at 144. It is understood, however, that the electrical receptacle 82 may be mounted to any other wall of power inlet housing 140.

With the arrangement of FIG. 10, cord 106 is contained within internal cavity 62' when not in use. When it is desired to provide auxiliary power from generator 10, door 64 is opened to provide access to cord 106, which is withdrawn from internal cavity 62'. Cover 142 is then moved to its open position, and twist-type connector 110 is engaged with prongs 83 of electrical receptacle 82, which is concealed by cover 142. Generator plug 108 is then engaged with the power outlet of generator 10, in the same manner as discussed previously.

The version of the power inlet arrangement illustrated in FIG. 10 isolates cord 106 and its associated connectors from the power inlet when cord 106 is not in use. Enclosure 50' thus functions solely as a storage receptacle for cord 106, to maintain cord 106 in a convenient location in the vicinity of power inlet housing 140 to ensure that cord 106 is available when needed.

Power inlet housing 140 is shown as being mounted to or engaged with enclosure 50'. It is understood, however, that power inlet housing 140 may be a structure separate from enclosure 50', and may be engageable with the exterior building wall separately from enclosure 50'. This arrangement would essentially be similar to the prior art power inlet system of FIG. 1, with the exception that a cord storage box would be located in the vicinity of power inlet 20 to ensure that cord 44 is always available when needed.

It can thus be appreciated that power inlet arrangement 49 provides a unique, convenient mechanism for storing a generator connecting cord when not in use and avoiding the inconvenience of locating or constructing a specially made cord for connection to a generator. The invention combines a generator power inlet with cord storage, while at the same time providing selective engagement of the cord for supplying power to the main electrical panel in order to provide quick, easy and reliable connection of generator 10 when needed.

Various alternatives and embodiments are contemplated as being within the scope of the following claims particularly pointing out and distinctly claiming the subject matter regarded as the invention.

I claim:

1. In a remote power inlet electrically connected to a power distribution panel for supplying power to the power distribution panel from a power generator having an outlet, the improvement comprising an enclosure located adjacent a power inlet housing and defining an internal cavity, wherein the enclosure includes a door for selectively providing access to the internal cavity wherein the internal cavity is adapted to receive a power cord for interconnecting the power inlet with a generator power outlet, wherein the power cord is adapted to be received within the internal cavity and enclosed by the door when not in use, and wherein the power cord defines a first end selectively engageable with a receptacle located in the power inlet housing and a second end selectively engageable with the generator power outlet.

2. The improvement of claim 1, wherein the power cord terminates at its first end in a connector engageable with the electrical receptacle associated with the power inlet housing, such that the power cord is removably secured to and electrically connected to the power inlet housing.

3. The improvement of claim 2, wherein the connector is rotatably engageable with the electrical receptacle to define a twist-locking system therebetween.

4. The improvement of claim 1, wherein the enclosure defines an inner wall, and wherein the power inlet is secured adjacent to the inner wall of the enclosure.

5. The improvement of claim 1, wherein the power inlet is located exteriorly of the internal cavity defined by the enclosure.

6. The improvement of claim 1, wherein the door is movable between an open position and a closed position, and wherein the enclosure includes a notch such that the power cord passes through the notch and is engageable with the power generator outlet when the door is in the closed position.

7. The improvement of claim 1, wherein the enclosure includes a securing mechanism for selectively securing the door to prevent access to the interior of the enclosure.

8. The improvement of claim 1, wherein the enclosure includes a plurality of walls and wherein the power inlet is at least partially defined by one or more of the enclosure walls.

9. A power inlet arrangement for use with a portable generator having a power supply outlet, comprising:

an enclosure including walls defining an internal cavity, wherein the enclosure includes a door which is selectively movable between an open position providing access to the internal cavity and a closed position for maintaining an electrical cord within an interior of the enclosure when the electrical cord is in a storage position;

a power inlet housing located adjacent the internal cavity of the enclosure, wherein the power inlet housing includes one or more walls and defining an interior within which an electrical receptacle is located, wherein the electrical receptacle is adapted for interconnection with a power transfer panel for controlling the supply of power from the generator to an electrical system of a building; and wherein the electrical cord has a first end selectively engageable with the electrical receptacle and a second end having an electrical plug, wherein the electrical cord includes a series of wires engaged with the electrical receptacle, and wherein the electrical cord is adapted to be stored within the internal cavity of the enclosure when not in use and maintained therein by movement of the door to the closed position, and wherein the electrical cord is adapted to be withdrawn from the internal cavity for use by movement of the door to the open position and withdrawal of the cord outwardly of the internal cavity, wherein the first end of the cord is engaged with the electrical receptacle and wherein the plug at the second end of the cord is engageable with the power supply outlet of the generator to supply power to the cord and to the electrical receptacle and through the electrical receptacle to the power transfer panel and building electrical system.

10. The power inlet arrangement of claim 9, wherein the electrical receptacle includes a series of prongs, and wherein the first end of the cord has a connector engageable with the prongs of the electrical receptacle.

11. The power inlet arrangement of claim 9, wherein the one or more walls of the power inlet housing are disposed at an angle relative to each other, wherein each of the one or more walls defines an end adapted for placement adjacent the one of a first wall and a second wall of the enclosure, wherein the first and second walls of the enclosure cooperate with the one or more walls of the power inlet housing to define the interior of the power inlet housing.

12. The power inlet arrangement of claim 11, wherein the power inlet housing is located at a lower portion of the internal cavity defined by the walls of the enclosure, and wherein the electrical cord is adapted to be placed within the internal cavity of the enclosure above the power inlet housing.

13. The power inlet arrangement of claim 12, wherein one or more walls of the power inlet housing include an upstanding vertical cover plate extending upwardly from the lower wall of the enclosure.

14. The power inlet arrangement of claim 13, wherein the vertical cover plate is removable relative to the walls of the enclosure for selectively providing access to the wires engaged with the electrical receptacle.

15. The power inlet arrangement of claim 11, wherein the walls of the enclosure define an opening, and the door is pivotably mounted to one of the walls of the enclosure for selectively providing access to the internal cavity through the opening and preventing access to the internal cavity through the opening.

16. The power inlet arrangement claim 9, wherein the power inlet housing is located exteriorly of the internal cavity of the enclosure.

17. The power inlet arrangement of claim 9, wherein the power inlet housing includes a terminal or junction block interconnected with the wires engaged with the electrical receptacle.

18. A method of connecting a portable generator to an electrical system of a building, comprising the steps of:

mounting an enclosure to a wall of the building wherein the enclosure includes walls defining an internal cavity and wherein the enclosure includes a door which is selectively movable between an open position providing access to the internal cavity and a closed position preventing access to the internal cavity, wherein the enclosure further includes an electrical cord having a first end and a second end, wherein the first end of the electrical cord includes an electrical plug adapted to engage a power supply outlet of the generator, and wherein the second end of the electrical cord is selectively engageable with an electrical receptacle located in a power inlet housing arrangement located adjacent the enclosure, the power inlet receptacle interconnected with a power transfer panel interconnected with the electrical system of the building, and wherein the electrical cord is adapted to be stored within the internal cavity when not in use; selectively moving the door to the open position to provide access to the internal cavity and to the electrical cord; withdrawing the electrical cord from the internal cavity; and engaging the plug at the second end of the electrical cord with the power supply outlet of the portable generator.

19. The method of claim 18, further comprising the step of mounting wall structure within the internal cavity for forming a compartment within which the power inlet receptacle is located, wherein the second end of the electrical cord is engageable with a series of prongs provided in the electrical receptacle, and wherein a first set of wires are engaged with the power inlet receptacle for interconnection with the electrical system of the building.

20. The method of claim 18, further comprising the step of moving the door of the enclosure to the closed position when the cord is withdrawn from the internal cavity.

21. The method of claim 18, further comprising the step of engaging the cord within a notch formed in a wall of the enclosure wherein the notch establishes communication exteriorly of the internal cavity.

22. The method of claim 19, wherein the step of mounting wall structure within the internal cavity for forming a compartment includes the step of providing a terminal or junction block which is interconnected with the first set of wires engaged with the power inlet receptacle, and wherein a second set of wires are engaged with the terminal or junction block for interconnection with the electrical system of a building.

* * * * *